(12) United States Patent
Mohassel et al.

(10) Patent No.: US 12,067,575 B2
(45) Date of Patent: *Aug. 20, 2024

(54) METHOD, SYSTEM, AND COMPUTER PROGRAM PRODUCT FOR DETERMINING SOLVENCY OF A DIGITAL ASSET EXCHANGE

(71) Applicant: Visa International Service Assocation, San Francisco, CA (US)

(72) Inventors: Payman Mohassel, San Jose, CA (US); Shashank Agrawal, Mountain View, CA (US); Chaya Ganesh, New York, NY (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/125,864

(22) Filed: Mar. 24, 2023

(65) Prior Publication Data
US 2023/0245131 A1    Aug. 3, 2023

Related U.S. Application Data

(63) Continuation of application No. 16/624,618, filed as application No. PCT/US2018/040553 on Jul. 2, 2018, now Pat. No. 11,645,658.

(Continued)

(51) Int. Cl.
*G06Q 20/40* (2012.01)
*G06Q 20/06* (2012.01)
(Continued)

(52) U.S. Cl.
CPC ......... *G06Q 20/403* (2013.01); *G06Q 20/065* (2013.01); *G06Q 20/3827* (2013.01);
(Continued)

(58) Field of Classification Search
CPC .............. G06Q 20/403; G06Q 20/065; G06Q 20/3827; G06Q 2220/00; G06Q 20/389;
(Continued)

(56) References Cited

U.S. PATENT DOCUMENTS

2015/0244525 A1* 8/2015 McCusker ............ H04L 9/3218
380/44

OTHER PUBLICATIONS

Dagher et al., Provisions: Privacy-preserving Proofs of Solvency for Bitcoin Exchanges, Oct. 26, 2015, https://jbonneau.com/doc/DBBCB15-CCS-provisions.pdf (Year: 2015).*

(Continued)

*Primary Examiner* — John W Hayes
*Assistant Examiner* — Yingying Zhou
(74) *Attorney, Agent, or Firm* — The Webb Law Firm

(57) ABSTRACT

Disclosed is a method, system, and computer program product for determining solvency of a digital asset exchange system. The method includes identifying a plurality of blockchain addresses corresponding to a plurality of users of a digital asset exchange system, generating a first commitment to an amount of digital assets corresponding to the plurality of blockchain addresses, and generating a second commitment to a balance of each user of the plurality of users. The method also includes generating a first component of a zero-knowledge algorithm that is configured to receive, as input, the first commitment. The method further includes generating, with at least one processor, a second component of the zero-knowledge algorithm that is configured to receive, as input, the second commitment. The method further includes determining that the digital asset exchange system is solvent based on the zero-knowledge algorithm.

20 Claims, 6 Drawing Sheets

Related U.S. Application Data

(60) Provisional application No. 62/690,389, filed on Jun. 27, 2018, provisional application No. 62/527,519, filed on Jun. 30, 2017.

(51) Int. Cl.
    *G06Q 20/38* (2012.01)
    *H04L 9/00* (2022.01)
    *H04L 9/06* (2006.01)
    *H04L 9/32* (2006.01)

(52) U.S. Cl.
    CPC .......... *H04L 9/0643* (2013.01); *H04L 9/3218* (2013.01); *H04L 9/3236* (2013.01); *H04L 9/3263* (2013.01); *G06Q 2220/00* (2013.01); *H04L 9/50* (2022.05); *H04L 2209/56* (2013.01)

(58) Field of Classification Search
    CPC .. G06Q 40/02; G06Q 20/223; G06Q 20/3829; G06Q 40/04; H04L 9/0643; H04L 9/3218; H04L 9/3236; H04L 9/3263; H04L 9/50; H04L 2209/56; H04L 9/3239; H04L 9/3247; H04L 9/3297; H04L 63/08
    See application file for complete search history.

(56) References Cited

OTHER PUBLICATIONS

Ben-Sasson et al., Zerocash: Decentralized Anonymous Payments from Bitcoin, 2014, IEEE Computer Society, pp. 459-474 (Year: 2014).*

Ben-Sasson et al., "Zerocash: Decentralized Anonymous Payments from Bitcoin", IEEE Computer Society, 2014, pp. 459-474.

Dagher et al., "Provisions: Privacy-preserving proofs of solvency for Bitcoin exchanges", Oct. 26, 2015, 33 pages.

* cited by examiner

METHOD, SYSTEM, AND COMPUTER PROGRAM PRODUCT FOR DETERMINING SOLVENCY OF A DIGITAL ASSET EXCHANGE

CROSS-REFERENCE TO RELATED APPLICATIONS

This application is a continuation of U.S. patent application Ser. No. 16/624,618, filed Jul. 2, 2018, which is the United States national phase of International Application No. PCT/US2018/040553, filed Jul. 2, 2018, which claims priority to U.S. Provisional Patent Application No. 62/527,519, filed Jun. 30, 2017, and U.S. Provisional Patent Application No. 62/690,389, filed Jun. 27, 2018, the disclosures of which are hereby incorporated by reference in their entireties.

BACKGROUND

1. Technical Field

Disclosed embodiments relate generally to zero-knowledge proofs of compound statements, and in some non-limiting embodiments or aspects or aspects, to a system, method, and computer program product for determining solvency of a digital asset exchange and/or verifying anonymous digital certificates.

2. Technical Considerations

A zero-knowledge proof (ZKP) allows one to prove a statement about a secret piece of information without revealing what the secret is. A ZKP typically satisfies at least three properties: completeness, soundness, and zero-knowledge. Regarding completeness, if a statement is true, an honest verifier will be convinced that the statement is true by an honest prover. Regarding soundness, if a statement is false, there is zero or a very small probability that a dishonest prover can convince an honest verifier that the statement is true. Regarding zero-knowledge, if a statement is true, knowledge of the statement does not convey knowledge of the secret. For example, let R be an efficiently computable binary relation which consists of pairs of the form (s, w) where s is a statement and w is a witness. Let L be the language associated with R, e.g., L={s|∃w s.t. R(s, w)=1}. A zero-knowledge proof for L lets a prover P convince a verifier V that s∈L for a common input s without revealing w. A proof of knowledge captures not only the truth of a statement s∈L, but also that the prover "possesses" a witness w to this fact. A non-interactive proof is where P sends only one message to V, and V decides whether to accept or not based on its input, the message, and any public parameters.

The statements for which ZKPs are required can vary in nature, such as a Boolean statement (e.g., true or false), an algebraic statement (e.g., a sum of two quantities is equal to a third one), and/or the like. Because underlying statements vary, so can the types of ZKPs. Different ZKPs for different types of statements are generally not compatible with each other, forcing researchers to use only one kind of proof when instead a combination of several proofs may be desired. When more than one statement is to be proved, particularly when the statement functions are layered such that the output of one function is the input to another, complex compound statements are created for which there exist no efficient ZKPs. For example, two-layer compound statements may be combinations of arithmetic on algebraic, algebraic on arithmetic, arithmetic on arithmetic, or algebraic on algebraic. Other configurations of compound statements are possible.

Consider, for example, proofs by cryptocurrency (e.g., Bitcoin) exchanges to prove that they are solvent, e.g., prove that the exchange controls sufficient cryptocurrency to cover all user accounts. A proof of solvency includes two parts: a proof of liabilities, e.g., total cryptocurrency owed to users of the exchange; and a proof of assets, e.g., total cryptocurrency controlled by exchange. If the assets equal or exceed the liabilities, the exchange is fully solvent. A proof of solvency is generally straightforward if a public ledger provides full details of all transactions, including the values transferred and the identities of the sender/receiver accounts. However, it becomes challenging to prove solvency if the privacy of users and accounts is to be maintained.

A ZKP of solvency would allow a cryptocurrency exchange to verify to its users that it controls sufficient funds without revealing the amount or distribution of the funds and liabilities. Without cryptographic proofs of solvency, exchanges may be relegated to soliciting third-party auditors to verify funds, which requires users to trust the third-party auditor, and the auditor to maintain the privacy of the data. Therefore, there is a need in the art for efficient ZKPs of statements of solvency.

The underlying statement that an exchange would need to prove is mostly algebraic (e.g., that assets exceed or equal liabilities), but a critical part of the statement is Boolean (e.g., an equivalence check of a hash function)—although the public keys of user wallets are derived from the secret key in an algebraic manner, only a hash of the public key, which is computed through a Boolean circuit, is put on the blockchain to save bandwidth. Sigma-protocol ZKPs, such as those employed by the Provisions system, excel in proving algebraic statements, e.g., knowledge of a private value x such that $g^x=y$. See Dagher, Gaby G. et al., *Provisions: Privacy-preserving Proofs of Solvency for Bitcoin Exchanges*, Association for Computing Machinery (ACM) Conference on Computer and Communications Security (CCS), 2015. However, Provisions is incompatible with cryptocurrencies such as Bitcoin that store hashed public keys (e.g., $H(g^x)=h$) in the blockchain. On the other hand, zkSNARKs, such as those employed by the Zerocash system, excel in proving complex, non-algebraic statements, e.g., knowledge of a private value x such that $SHA256(x)=y$. See Ben-Sasson, Eli et al., *Zerocash: Decentralized Anonymous Payments from Bitcoin*, IEEE Symposium on Security and Privacy, 2014. It is not known how to efficiently combine these two techniques. Doing so would require proving knowledge of a private x such that $H(g^x)=y$, which contains both algebraic and non-algebraic statements that are prohibitively difficult and inefficient to prove with current methods.

The need for ZKPs of compound statements extends beyond proofs of solvency by cryptocurrency exchanges. For instance, digital certificates are used to identify entities over the Internet, wherein messages are sent and signed with a digital signature. Anonymous credentials of digital certificates for such messages require a message and a signature to remain secret, while still proving that the signature is valid. In this application, the message is hashed before being algebraically signed. Thus, the ZKP statement to be proven is a compound statement of algebraic and Boolean functions, for which there exist no known efficient ZKP techniques. In yet another example, current cryptocurrency systems such as ZCash operate as anonymous decentralized digital currency and use zkSNARKs to prove many smaller components in one large statement. The common reference string for proving the statement can become extremely large (e.g., gigabytes, in the case of ZCash). It would be beneficial to have a system of ZKPs to prove smaller individual compound statements, where the output of one statement is the input of another, and therein reduce the size of the common reference string.

Therefore, there is a need in the art to provide an efficient system of zero-knowledge proofs for compound statements. There is also a need in the art to provide a system for determining solvency of a digital asset exchange using a zero-knowledge algorithm and for a system for verifying digital signatures using a zero-knowledge algorithm.

SUMMARY

Accordingly, and generally, provided is an improved system, computer-implemented method, and computer program product for generating zero-knowledge algorithms of compound statements, an improved system, method, and computer program product for determining solvency of a digital asset exchange, and an improved system, method, and computer program product for verifying anonymous digital certificates.

According to some non-limiting embodiments or aspects, provided is a computer-implemented method for determining solvency of a digital asset exchange system, including: identifying, with at least one processor, a plurality of blockchain addresses corresponding to a plurality of users of the digital asset exchange system, each blockchain address of the plurality of blockchain addresses including a value generated by hashing a public key corresponding to a private key controlled by the digital asset exchange system, such that the public key and the private key are not exposed on a blockchain network; generating, with at least one processor, a first commitment to an amount of digital assets corresponding to the plurality of blockchain addresses; generating, with at least one processor, a second commitment to a balance of each user of the plurality of users; generating, with at least one processor, a first component of a zero-knowledge algorithm configured to receive, as input, the first commitment, and to output a value generated based on each public key corresponding to each blockchain address, such that the first component of the zero-knowledge algorithm proves to a verifying system that the digital asset exchange system has access to each public key corresponding to each blockchain address; generating, with at least one processor, a second component of the zero-knowledge algorithm configured to receive, as input, the second commitment, and to output a value generated based on each user balance, such that the second component of the zero-knowledge algorithm proves to a verifying system that each user balance is included in the amount of digital assets; and determining, with at least one processor, that the digital asset exchange system is solvent based on the zero-knowledge algorithm.

In some non-limiting embodiments or aspects, the first component of the zero-knowledge algorithm includes a zkSNARK protocol, and wherein the second component of the zero-knowledge algorithm includes a Sigma protocol. In some non-limiting embodiments or aspects, the first component of the zero-knowledge algorithm is a Boolean function. In some non-limiting embodiments or aspects, the second component of the zero-knowledge algorithm is an algebraic function.

In some non-limiting embodiments or aspects, determining that the digital asset exchange system is solvent includes determining if an output of the algebraic function is an input to the Boolean function. In some non-limiting embodiments or aspects, the blockchain network includes the Bitcoin public blockchain network. In some non-limiting embodiments or aspects, the first commitment includes a first point along an elliptic curve, and wherein the second commitment includes a second point along an elliptic curve.

According to another non-limiting embodiment, provided is a system for determining solvency of a digital asset exchange system, including: a secure data storage device including a plurality of public/private key pairs for a plurality of users of the digital asset exchange system; and at least one processor in communication with a blockchain network, the at least one processor programmed or configured to: identify a plurality of blockchain addresses corresponding to the plurality of users of the digital asset exchange system, each blockchain address of the plurality of blockchain addresses including a value generated by hashing a public key corresponding to a private key controlled by the digital asset exchange system and stored on the secure data storage device, such that the public key and the private key are not exposed on the blockchain network; generate a first commitment to an amount of digital assets corresponding to the plurality of blockchain addresses; generate a second commitment to a balance of each user of the plurality of users; generate a first component of a zero-knowledge algorithm configured to receive, as input, the first commitment, and to output a value generated based on each public key corresponding to each blockchain address, such that the first component of the zero-knowledge algorithm proves to a verifying system that the digital asset exchange system has access to each public key corresponding to each blockchain address; generate a second component of the zero-knowledge algorithm configured to receive, as input, the second commitment, and to output a value generated based on each user balance, such that the second component of the zero-knowledge algorithm proves to a verifying system that each user balance is included in the amount of digital assets; and determine that the digital asset exchange system is solvent based on the zero-knowledge algorithm.

In some non-limiting embodiments or aspects, the first component of the zero-knowledge algorithm includes a zkSNARK protocol, and wherein the second component of the zero-knowledge algorithm includes a Sigma protocol. In some non-limiting embodiments or aspects, the first component of the zero-knowledge algorithm is a Boolean function. In some non-limiting embodiments or aspects, the second component of the zero-knowledge algorithm is an algebraic function. In some non-limiting embodiments or aspects, determining that the digital asset exchange system is solvent includes determining if an output of the algebraic function is an input to the Boolean function.

In some non-limiting embodiments or aspects, the blockchain network includes the Bitcoin public blockchain network. In some non-limiting embodiments or aspects, the first commitment includes a first point along an elliptic curve, and wherein the second commitment includes a second point along an elliptic curve.

According to another non-limiting embodiment, provided is a computer program product for determining solvency of a digital asset exchange system, including at least one non-transitory computer-readable medium including program instructions that, when executed by at least one processor, cause the at least one processor to: identify a plurality of blockchain addresses of a blockchain network corresponding to a plurality of users of the digital asset exchange system, each blockchain address of the plurality of blockchain addresses including a value generated by hashing a public key corresponding to a private key controlled by the digital asset exchange system and stored on the secure data storage device, such that the public key and the private key are not exposed on a blockchain network; generate a first commitment to an amount of digital assets corresponding to the plurality of blockchain addresses; generate a second commitment to a balance of each user of the plurality of users; generate a first component of a zero-knowledge algorithm configured to receive, as input, the first commitment, and to output a value generated based on each public key corresponding to each blockchain address, such that the first component of the zero-knowledge algorithm proves to a verifying system that the digital asset exchange system has access to each public key corresponding to each blockchain address; generate a second component of the zero-knowledge algorithm configured to receive, as input, the second commitment, and to output a value generated based on each user balance, such that the second component of the zero-knowledge algorithm proves to a verifying system that each user balance is included in the amount of digital assets; and determine that the digital asset exchange system is solvent based on the zero-knowledge algorithm.

In some non-limiting embodiments or aspects, the first component of the zero-knowledge algorithm includes a zkSNARK protocol, and wherein the second component of the zero-knowledge algorithm includes a Sigma protocol. In some non-limiting embodiments or aspects, the first component of the zero-knowledge algorithm is a Boolean function. In some non-limiting embodiments or aspects, the second component of the zero-knowledge algorithm is an algebraic function. In some non-limiting embodiments or aspects, determining that the digital asset exchange system is solvent includes determining if an output of the algebraic function is an input to the Boolean function.

In some non-limiting embodiments or aspects, the blockchain network includes the Bitcoin public blockchain network. In some non-limiting embodiments or aspects, the first commitment includes a first point along an elliptic curve, and wherein the second commitment includes a second point along an elliptic curve.

According to a further non-limiting embodiment, provided is a computer-implemented method for generating and verifying anonymous digital certificates, including: generating, with at least one processor of a proving system, a digital signature by encrypting a hashed message with a private key based on an asymmetrical encryption algorithm; communicating, with the at least one processor, the digital signature to a verifying system; generating, with the at least one processor, a commitment to a message used to generate the hashed message; generating, with the at least one processor, a first component of a zero-knowledge algorithm configured to receive, as input, the commitment, and output a value based on the message used to generate the hashed message; generating, with the at least one processor, a second component of the zero-knowledge algorithm configured to receive, as input, the commitment, and output a value based on the private key used to generate the digital signature; and generating, with the at least one processor, the zero-knowledge algorithm based on the first component and the second component.

In some non-limiting embodiments or aspects, the commitment to the message includes a point along an elliptic curve. In some non-limiting embodiments or aspects, the method includes verifying, by at least one processor of the verifying system, the digital signature based on the commitment and the zero-knowledge algorithm.

In some non-limiting embodiments or aspects, the first component of the zero-knowledge algorithm includes a zkSNARK protocol, and wherein the second component of the zero-knowledge algorithm includes a Sigma protocol. In some non-limiting embodiments or aspects, the first component of the zero-knowledge algorithm is a Boolean function. In some non-limiting embodiments or aspects, the second component of the zero-knowledge algorithm is an algebraic function. In some non-limiting embodiments or aspects, determining that the digital asset exchange system is solvent includes determining if an output of the algebraic function is an input to the Boolean function.

Accordingly to yet another non-limiting embodiment, provided is a system for generating and verifying anonymous digital certificates, including: a secure data storage device including a private key of a public/private key pair and a message; and a proving computer including at least one processor programmed or configured to: generate a digital signature by encrypting a hash of the message with the private key based on an asymmetrical encryption algorithm; communicate the digital signature to a verifying computer; generate a commitment to the message; generate a first component of a zero-knowledge algorithm configured to receive, as input, the commitment, and output a value based on the message used to generate the hashed message; generate a second component of the zero-knowledge algorithm configured to receive, as input, the commitment, and output a value based on the private key used to generate the digital signature; generate the zero-knowledge algorithm based on the first component and the second component; and communicate the zero-knowledge algorithm to the verifying computer.

In some non-limiting embodiments or aspects, the commitment to the message includes a point along an elliptic curve. In some non-limiting embodiments or aspects, the system includes the verifying computer, the verifying computer including at least one processor programmed or configured to verify the digital signature based on the commitment and the zero-knowledge algorithm. In some non-limiting embodiments or aspects, the first component of the zero-knowledge algorithm includes a zkSNARK protocol, and wherein the second component of the zero-knowledge algorithm includes a Sigma protocol. In some non-limiting embodiments or aspects, the first component of the zero-knowledge algorithm is a Boolean function. In some non-limiting embodiments or aspects, the second component of the zero-knowledge algorithm is an algebraic function. In some non-limiting embodiments or aspects, the at least one processor is further programmed to verify the digital signature based on the zero-knowledge algorithm by determining that an output of the algebraic function is an input to the Boolean function.

According to another non-limiting embodiment, provided is a computer program product for generating and verifying anonymous digital certificates, including at least one non-transitory computer-readable medium including program instructions that, when executed by at least one processor, cause the at least one processor to: generate a digital signature by encrypting a hash of the message with a private key based on an asymmetrical encryption algorithm; communicate the digital signature to a verifying computer; generate a commitment to the message; generate a first component of a zero-knowledge algorithm configured to receive, as input, the commitment, and output a value based on the message used to generate the hashed message; generate a second component of the zero-knowledge algorithm configured to receive, as input, the commitment, and output a value based on the private key used to generate the digital signature; generate the zero-knowledge algorithm based on the first component and the second component; and communicate the zero-knowledge algorithm to the verifying computer.

In some non-limiting embodiments or aspects, the commitment to the message includes a point along an elliptic curve. In some non-limiting embodiments or aspects, the first component of the zero-knowledge algorithm includes a zkSNARK protocol, and wherein the second component of the zero-knowledge algorithm includes a Sigma protocol. In some non-limiting embodiments or aspects, the first component of the zero-knowledge algorithm is a Boolean function. In some non-limiting embodiments or aspects, the second component of the zero-knowledge algorithm is an algebraic function. In some non-limiting embodiments or aspects, the at least one processor is further causes to verify the digital signature based on the zero-knowledge algorithm by determining that an output of the algebraic function is an input to the Boolean function.

According to yet another non-limiting embodiment, provided is a new framework for ZKP proofs of compound statements that contain both algebraic and non-algebraic functions, by efficiently combining zkSNARKs and Sigma protocols. The combination allows for proofs of knowledge of x such that $AES(x)=y_1$ and $g^x=y_2$, while keeping x private. Furthermore, the present disclosure provides for proving knowledge of double-discrete-logs, e.g., knowledge of $y=g^{g^x}$ where g is the generator for an elliptic curve (EC) group, in particular, for Bitcoin's EC secp256k1. Previous techniques for such proofs are only effective for RSA-based groups and hence do not work with Bitcoin.

Further non-limiting embodiments or aspects of the present disclosure will be set forth in the following numbered clauses:

Clause 1: A computer-implemented method for determining solvency of a digital asset exchange system, including: identifying, with at least one processor, a plurality of blockchain addresses corresponding to a plurality of users of the digital asset exchange system, each blockchain address of the plurality of blockchain addresses comprising a value generated by hashing a public key corresponding to a private key controlled by the digital asset exchange system, such that the public key and the private key are not exposed on a blockchain network; generating, with at least one processor, a first commitment to an amount of digital assets corresponding to the plurality of blockchain addresses; generating, with at least one processor, a second commitment to a balance of each user of the plurality of users; generating, with at least one processor, a first component of a zero-knowledge algorithm configured to receive, as input, the first commitment, and to output a value generated based on each public key corresponding to each blockchain address, such that the first component of the zero-knowledge algorithm proves to a verifying system that the digital asset exchange system has access to each public key corresponding to each blockchain address; generating, with at least one processor, a second component of the zero-knowledge algorithm configured to receive, as input, the second commitment, and to output a value generated based on each user balance, such that the second component of the zero-knowledge algorithm proves to a verifying system that each user balance is included in the amount of digital assets; and determining, with at least one processor, that the digital asset exchange system is solvent based on the zero-knowledge algorithm.

Clause 2: The computer-implemented method of clause 1, wherein the first component of the zero-knowledge algorithm comprises a zkSNARK protocol, and wherein the second component of the zero-knowledge algorithm comprises a Sigma protocol.

Clause 3: The computer-implemented method of clause 1 or clause 2, wherein the first component of the zero-knowledge algorithm is a Boolean function.

Clause 4: The computer-implemented method of any of clauses 1-3, wherein the second component of the zero-knowledge algorithm is an algebraic function.

Clause 5: The computer-implemented method of any of clauses 1-4, wherein determining that the digital asset exchange system is solvent comprises determining if an output of the algebraic function is an input to the Boolean function.

Clause 6: The computer-implemented method of any of clauses 1-5, wherein the blockchain network comprises the Bitcoin public blockchain network.

Clause 7: The computer-implemented method of any of clauses 1-6, wherein the first commitment comprises a first point along an elliptic curve, and wherein the second commitment comprises a second point along an elliptic curve.

Clause 8: A system for determining solvency of a digital asset exchange system, comprising: a secure data storage device comprising a plurality of public/private key pairs for a plurality of users of the digital asset exchange system; and at least one processor in communication with a blockchain network, the at least one processor programmed or configured to: identify a plurality of blockchain addresses corresponding to the plurality of users of the digital asset exchange system, each blockchain address of the plurality of blockchain addresses comprising a value generated by hashing a public key corresponding to a private key controlled by the digital asset exchange system and stored on the secure data storage device, such that the public key and the private key are not exposed on the blockchain network; generate a first commitment to an amount of digital assets corresponding to the plurality of blockchain addresses; generate a second commitment to a balance of each user of the plurality of users; generate a first component of a zero-knowledge algorithm configured to receive, as input, the first commitment, and to output a value generated based on each public key corresponding to each blockchain address, such that the first component of the zero-knowledge algorithm proves to a verifying system that the digital asset exchange system has access to each public key corresponding to each blockchain address; generate a second component of the zero-knowledge algorithm configured to receive, as input, the second commitment, and to output a value generated based on each user balance, such that the second component of the zero-knowledge algorithm proves to a verifying system that each user balance is included in the amount of digital assets; and determine that the digital asset exchange system is solvent based on the zero-knowledge algorithm.

Clause 9: The system of clause 8, wherein the first component of the zero-knowledge algorithm comprises a zkSNARK protocol, and wherein the second component of the zero-knowledge algorithm comprises a Sigma protocol.

Clause 10: The system of clause 8 or clause 9, wherein the first component of the zero-knowledge algorithm is a Boolean function.

Clause 11: The system of any of clauses 8-10, wherein the second component of the zero-knowledge algorithm is an algebraic function.

Clause 12: The system of any of clauses 8-11, wherein determining that the digital asset exchange system is solvent comprises determining if an output of the algebraic function is an input to the Boolean function.

Clause 13: The system of any of clauses 8-12, wherein the blockchain network comprises the Bitcoin public blockchain network.

Clause 14: The system of any of clauses 8-13, wherein the first commitment comprises a first point along an elliptic curve, and wherein the second commitment comprises a second point along an elliptic curve.

Clause 15: A computer program product for determining solvency of a digital asset exchange system, comprising at least one non-transitory computer-readable medium including program instructions that, when executed by at least one processor, cause the at least one processor to: identify a plurality of blockchain addresses of a blockchain network corresponding to a plurality of users of the digital asset exchange system, each blockchain address of the plurality of blockchain addresses comprising a value generated by hashing a public key corresponding to a private key controlled by the digital asset exchange system and stored on the secure data storage device, such that the public key and the private key are not exposed on a blockchain network; generate a first commitment to an amount of digital assets corresponding to the plurality of blockchain addresses; generate a second commitment to a balance of each user of the plurality of users; generate a first component of a zero-knowledge algorithm configured to receive, as input, the first commitment, and to output a value generated based on each public key corresponding to each blockchain address, such that the first component of the zero-knowledge algorithm proves to a verifying system that the digital asset exchange system has access to each public key corresponding to each blockchain address; generate a second component of the zero-knowledge algorithm configured to receive, as input, the second commitment, and to output a value generated based on each user balance, such that the second component of the zero-knowledge algorithm proves to a verifying system that each user balance is included in the amount of digital assets; and determine that the digital asset exchange system is solvent based on the zero-knowledge algorithm.

Clause 16: The computer program product of clause 15, wherein the first component of the zero-knowledge algorithm comprises a zkSNARK protocol, and wherein the second component of the zero-knowledge algorithm comprises a Sigma protocol.

Clause 17: The computer program product of clause 15 or clause 16, wherein the first component of the zero-knowledge algorithm is a Boolean function.

Clause 18: The computer program product of any of clauses 15-17, wherein the second component of the zero-knowledge algorithm is an algebraic function.

Clause 19: The computer program product of any of clauses 15-18, wherein determining that the digital asset exchange system is solvent comprises determining if an output of the algebraic function is an input to the Boolean function.

Clause 20: The computer program product of any of clauses 15-19, wherein the blockchain network comprises the Bitcoin public blockchain network.

Clause 21: The computer program product of any of clauses 15-20, wherein the first commitment comprises a first point along an elliptic curve, and wherein the second commitment comprises a second point along an elliptic curve.

Clause 22: A computer-implemented method for generating and verifying anonymous digital certificates, comprising: generating, with at least one processor of a proving system, a digital signature by encrypting a hashed message with a private key based on an asymmetrical encryption algorithm; communicating, with the at least one processor, the digital signature to a verifying system; generating, with the at least one processor, a commitment to a message used to generate the hashed message; generating, with the at least one processor, a first component of a zero-knowledge algorithm configured to receive, as input, the commitment, and output a value based on the message used to generate the hashed message; generating, with the at least one processor, a second component of the zero-knowledge algorithm configured to receive, as input, the commitment, and output a value based on the private key used to generate the digital signature; and generating, with the at least one processor, the zero-knowledge algorithm based on the first component and the second component.

Clause 23: The computer-implemented method of clause 22, wherein the commitment to the message comprises a point along an elliptic curve.

Clause 24: The computer-implemented method of clause 22 or clause 23, further comprising verifying, by at least one processor of the verifying system, the digital signature based on the commitment and the zero-knowledge algorithm.

Clause 25: The computer-implemented method of any of clauses 22-24, wherein the first component of the zero-knowledge algorithm comprises a zkSNARK protocol, and wherein the second component of the zero-knowledge algorithm comprises a Sigma protocol.

Clause 26: The computer-implemented method of any of clauses 22-25, wherein the first component of the zero-knowledge algorithm is a Boolean function.

Clause 27: The computer-implemented method of any of clauses 25-26, wherein the second component of the zero-knowledge algorithm is an algebraic function.

Clause 28: The computer-implemented method of any of clauses 22-27, further comprising verifying the digital signature based on the zero-knowledge algorithm by determining that an output of the algebraic function is an input to the Boolean function.

Clause 29: A system for generating and verifying anonymous digital certificates, comprising: a secure data storage device comprising a private key of a public/private key pair and a message; and a proving computer comprising at least one processor programmed or configured to: generate a digital signature by encrypting a hash of the message with the private key based on an asymmetrical encryption algorithm; communicate the digital signature to a verifying computer; generate a commitment to the message; generate a first component of a zero-knowledge algorithm configured to receive, as input, the commitment, and output a value based on the message used to generate the hashed message; generate a second component of the zero-knowledge algorithm configured to receive, as input, the commitment, and output a value based on the private key used to generate the digital signature; generate the zero-knowledge algorithm based on the first component and the second component; and communicate the zero-knowledge algorithm to the verifying computer.

Clause 30: The system of clause 29, wherein the commitment to the message comprises a point along an elliptic curve.

Clause 31: The system of clause 29 or clause 30, further comprising the verifying computer, the verifying computer including at least one processor programmed or configured to verify the digital signature based on the commitment and the zero-knowledge algorithm.

Clause 32: The system of any of clauses 29-31, wherein the first component of the zero-knowledge algorithm comprises a zkSNARK protocol, and wherein the second component of the zero-knowledge algorithm comprises a Sigma protocol.

Clause 33: The system of any of clauses 29-32, wherein the first component of the zero-knowledge algorithm is a Boolean function.

Clause 34: The system of any of clauses 29-33, wherein the second component of the zero-knowledge algorithm is an algebraic function.

Clause 35: The system of any of clauses 29-34, further comprising verifying the digital signature based on the zero-knowledge algorithm by determining that an output of the algebraic function is an input to the Boolean function.

Clause 36: A computer program product for generating and verifying anonymous digital certificates, comprising at least one non-transitory computer-readable medium including program instructions that, when executed by at least one processor, cause the at least one processor to: generate a digital signature by encrypting a hash of the message with a private key based on an asymmetrical encryption algorithm; communicate the digital signature to a verifying computer; generate a commitment to the message; generate a first component of a zero-knowledge algorithm configured to receive, as input, the commitment, and output a value based on the message used to generate the hashed message; generate a second component of the zero-knowledge algorithm configured to receive, as input, the commitment, and output a value based on the private key used to generate the digital signature; generate the zero-knowledge algorithm based on the first component and the second component; and communicate the zero-knowledge algorithm to the verifying computer.

Clause 37: The computer program product of clause 36, wherein the commitment to the message comprises a point along an elliptic curve.

Clause 38: The computer program product of clause 36 or clause 37, wherein the first component of the zero-knowledge algorithm comprises a zkSNARK protocol, and wherein the second component of the zero-knowledge algorithm comprises a Sigma protocol.

Clause 39: The computer program product of any of clauses 36-38, wherein the first component of the zero-knowledge algorithm is a Boolean function.

Clause 40: The computer program product of any of clauses 36-39, wherein the second component of the zero-knowledge algorithm is an algebraic function.

Clause 41: The computer program product of any of clauses 36-40, further comprising verifying the digital signature based on the zero-knowledge algorithm by determining that an output of the algebraic function is an input to the Boolean function.

These and other features and characteristics of the present disclosure, as well as the methods of operation and functions of the related elements of structures and the combination of parts and economies of manufacture, will become more apparent upon consideration of the following description, Appendices, and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying figures, in which.

DETAILED DESCRIPTION

Figure 1:
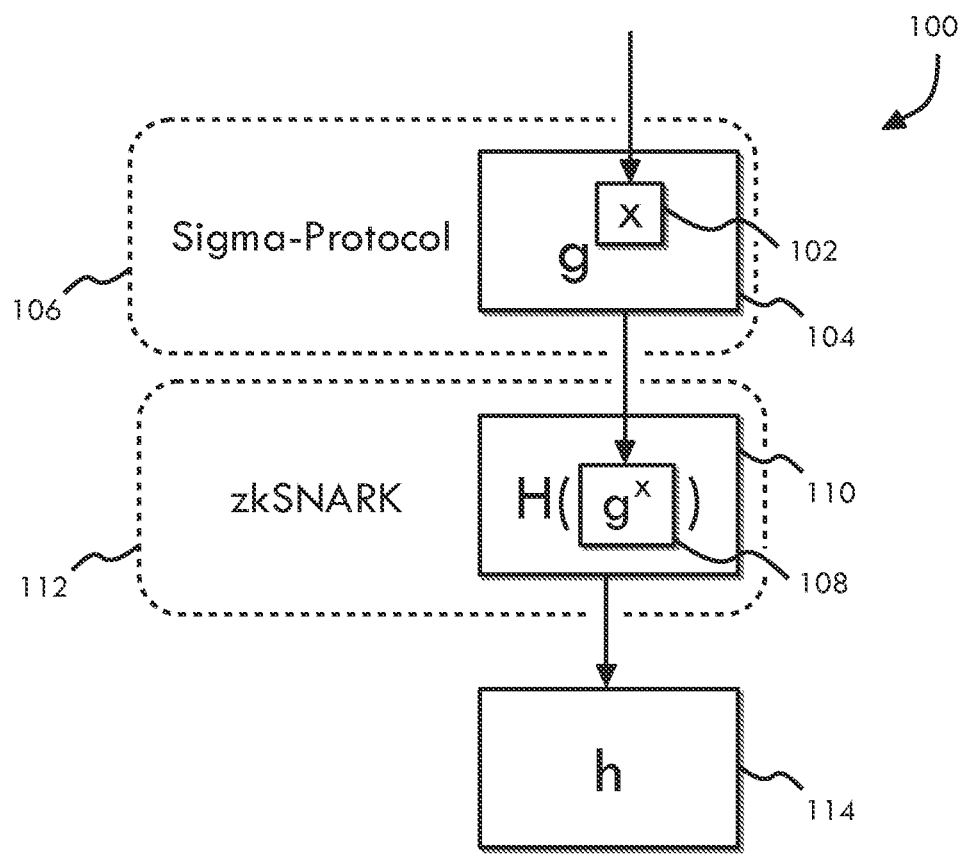
FIG. 1 is a schematic diagram of one embodiment or aspect of a system and method for generating zero-knowledge algorithms of compound statements, and in particular, zero-knowledge algorithms of a combination of algebraic and Boolean statements.

For purposes of the description hereinafter, the terms "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments of the disclosure. Hence, specific dimensions and other physical characteristics related to the embodiments disclosed herein are not to be considered as limiting. Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "digital asset" refers to a unit of value that exists in an electronic, digital form, such as not limited to cryptocurrency units, license keys, smart contracts, and/or the like. A "digital asset exchange" and a "digital asset exchange system" refer to one or more computing devices configured to manage and control digital assets.

As used herein, the term "cryptocurrency" refers to a digital currency in which cryptographic techniques are used to create and regulate the distribution thereof. In some non-limiting examples, cryptocurrencies are maintained, transferred, and created in a decentralized blockchain network without a central authority, such as a financial institution, acting as an intermediary. Cryptocurrencies may include Bitcoin, Ethereum, XRP, Bitcoin Cash, Litecoin, ZeroCash, and/or other digital currencies.

As used herein the term "zkSNARK" (zero-knowledge Succinct Non-interactive ARgument of Knowledge) refers to a non-interactive zero-knowledge argument of knowledge for a relation R with a Succinctness property which means that, for any s and w, the length of the proof π is given by $|\pi|=\text{poly}(\kappa)\text{polylog}(|s|+|w|)$.

As used herein, the term "Sigma protocol" refers to a two-party interactive protocol with the following structure. Let P (the prover) and V (the verifier) be two parties with common input s and a private input w for P. In a Sigma protocol, P sends a message a, V replies with a random κ-bit string r, P then sends a message e, and V decides to accept or reject based on the transcript (a, r, e). A Sigma protocol between a prover P and a verifier V is a Σ protocol for a relation R if the following properties are satisfied: (1) It is a three move public coin protocol; (2) Completeness: If P and V follow the protocol then $\Pr[\langle P(w), V\rangle (s)=1]=1$ whenever $(s,w)\in R$; (3) Special soundness: There exists a polynomial time algorithm called the extractor which when given s and two transcripts (a, r, e) and (a, r', e') that are accepting for s, with r≠r', outputs w' such that (s, w')∈R; and (4) Special honest verifier zero knowledge: There exists a polynomial time simulator which on input s and a random r outputs a transcript (a, r, e) with the same probability distribution as that generated by an honest interaction between P and V on (common) input s.

As used herein, the term "commitment" refers to a value generated based on one or more inputs such that the value can be published without revealing the one or more inputs. For example, generating a commitment based on an input may involve processing that input with one or more hash or elliptic curve algorithms. In some examples, a commitment may be represented by a point along a curve as identified by x and y coordinates. As used herein, the function "Com(x)" is used to denote a commitment to variable x.

As used herein, the term "zero-knowledge algorithm" refers to one or more functions, processes, and/or calculations configured to verify that a system or entity has knowledge of or access to one or more values, such as but not limited to private keys corresponding to public keys in an asymmetric cryptography schema. A zero-knowledge algorithm may include proofs that a verifying system can calculate with given inputs on both sides.

Non-limiting embodiments or aspects of the disclosure may be implemented on one or more computing devices including at least one processor, such as but not limited to one or more servers, computers, mobile devices, and/or the like. As used herein, the terms "proving system" and "proving computer" refer to one or more computing devices operated by a user or entity seeking to prove that it has access to a secret key or secret information. The terms "verifying system" and "verifying computer" refer to one or more computing devices operated by a user or entity seeking to verify that the proving system has the secret key or secret information without itself having access to it. It will be appreciated that various other implementations are possible.

Non-limiting embodiments provide for a reduction in computational resources needed to execute zero-knowledge algorithms for compound computational statements. By generating commitments to secret values and generating first and second components of a zero-knowledge algorithm, non-limiting embodiments of the system provide for a zero-knowledge algorithm that may be executed by a verifying system given the commitments as input/output in an efficient manner and using fewer processing cycles than other zero-knowledge algorithms that are not constructed with first and second components and configured to use commitments. For example, in some non-limiting embodiments or aspects of a system for determining solvency of a digital asset exchange, the improved zero-knowledge algorithm allows for users to use standard computers as verifying systems to efficiently verify the solvency of the digital asset exchange and that the users' balances are included in a total amount of digital assets. As another example, in some non-limiting embodiments or aspects of a system for generating and verifying anonymous digital signatures, the improved zero-knowledge algorithm allows for users to use standard computers as verifying systems to efficiently verify the digital signature without having access to the private key or underlying message.

With specific reference to FIG. 1, and in some non-limiting embodiments or aspects, provided is a system and method 100 for generating zero-knowledge algorithms of compound statements. In particular, depicted is a compound statement that is a hybrid of an algebraic function ($g^x=y$) and a Boolean function (H(y)=h), which may be used to prove solvency for a digital asset exchange. As shown, there exists a private key 102 "x" for which there corresponds one or more public keys 104 "$g^x$" or "y." In the context of Bitcoin, a private key 102 may be a 256-bit number (although, some implementations may use between 128 and 512 bits). A public key 104 is derived from the private key 102, generally by elliptic-curve conversion. In the context of Bitcoin, a public key 104 may be a 65 byte number, including 32 bytes corresponding to an "X" coordinate integer of the elliptic curve and 32 bytes corresponding to a "Y" coordinate integer of the elliptic curve. A sigma-protocol ZKP 106 may be used to prove that a cryptocurrency exchange knows (and presumably controls) the private key 102 corresponding to the public key 104. The output of the sigma-protocol ZKP 106 function may be used as the input 108 of a hash algorithm 110. In the context of Bitcoin, a public key 104 may undergo at least a SHA-256 hash to generate a hash output 114. A zkSNARK ZKP 112 may be used to prove that the cryptocurrency exchange knows (and presumably controls) a public key 104 corresponding to the hash output 114. The present disclosure provides for a separate ZKP to show that the output of the algebraic ZKP 106 is the input 108 for the Boolean ZKP 112. In this manner, the two ZKPs can be layered through an efficient ZKP that does not reveal the underlying values interconnecting the functions. The compound statements may be any suitable combination or hybrid of functions, such as algebraic-algebraic, arithmetic-algebraic, algebraic-arithmetic, arithmetic-arithmetic, and/or the like. It will be appreciated that other configurations of ZKP are possible.

Non-limiting embodiments of the system provide for the generation of computational statements that include ANDs, ORs, and function compositions of a mix of algebraic and arithmetic components. Non-limiting embodiments provide for new NIZKs for proof of knowledge of x, $x_1$, $x_2$, $y_1$, $y_2$ such that:

$$f_1(x_1, f_2(x_2)) = z$$

$$f_1(x, y_1) = z_1 \text{ AND } f_2(x, y_2) = z_2$$

$$f_1(x, y_1) = z_1 \text{ OR } f_2(x, y_2) = z_2$$

for public values z, $z_1$, $z_2$, and where $f_1$ and $f_2$ can be either algebraic or arithmetic. Using the NIZK techniques according to non-limiting embodiments for these compositions allow the system to handle arbitrary composite statements.

Non-limiting embodiments provide for the proving system to establish that the input/output used in a Sigma protocol for an algebraic statement is the same as input/output committed to by an algebraic commitment scheme, such as "Com." This enables using the output of an algebraic statement as an intermediate output in a composite statement. For instance, the proving system can show that it has access to h, $x_1$, $x_2$ such that $h = g_1^{x_1} g_2^{x_2}$ given $g_1$, $g_2$, Com(h), Com($x_1$), Com ($x_2$). To do so, the proving system generates a commitment to a point P on an elliptic curve $E(F_t)$ by committing to its coordinates, e.g. Com(P) = (Com$_q$($P_x$), Com$_q$ ($P_y$)) where P = ($P_x$, $P_y$) and q > t.

In some non-limiting embodiments or aspects, the system proves access to (e.g., knowledge of) two committed elliptic curve points P, Q, such that T = P + Q for a public point T. To do so, the system expands the elliptic curve addition/subtraction operation P + Q − T such that T = P + Q holds if and only if two sets of equations of the form L(·) = R(·) are maintained, where L and R are multivariate polynomials of degree 3 in the coordinates. Given commitments to the coordinate values and the output of polynomials L and R, the system proves the corresponding relations between the committed values using Sigma protocols. However, the addition operation over elliptic curve points is defined over $F_t$, while the commitment scheme may be defined over a different group of size q. While this difference may be addressed by using two different commitment schemes in groups of different orders, it would require performing the Complex Multiplication method to choose an elliptic curve group of a specific order which is inefficient and wastes computational resources. This method may also apply to a situation where T is also private and committed to.

Non-limiting embodiments of the proving system utilize double-discrete log proofs for elliptic-curve groups. For example, the proving system generates a commitment to a group element $g^x$ where g is a generator for an elliptic curve group and proves access to x such that Com($g^x$) = y given a public y. Such methods are not limited to RSA groups, which would not apply to Bitcoin because the Bitcoin protocol utilizes elliptic curve groups. Non-limiting embodiments of the proving system prove equality of committed values over different elliptic curve groups such that the system can prove access to x such that Com$_p$(x) = y and Com$_q$(x) = z for public values y, z where Com$_p$ denotes an algebraic commitment over an elliptic curve group of size p (similarly, Com$_q$). This method enables the proving system efficiently shift from proof systems in one group to another group by committing to the shared values in both groups and invoking a proof, thereby avoiding processing-intensive exponentiation operations.

Figure 2:
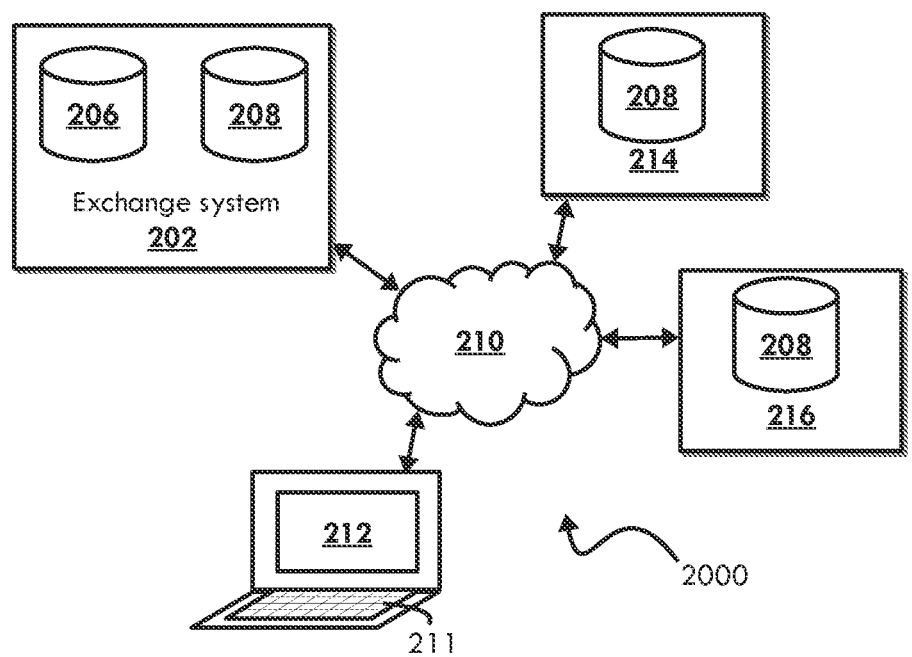
FIG. 2 is a schematic diagram of a system for determining solvency of a digital asset exchange according to some non-limiting embodiments or aspects.

Referring now to FIG. 2, a digital asset exchange solvency system 2000 is shown according to some non-limiting embodiments or aspects. The system 2000 includes an exchange system 202, which may include a cryptocurrency exchange that holds private keys corresponding to blockchain addresses for a plurality of users. In this example, the exchange system 202 functions as a proving system and includes one or more processors, a secure data storage device 206 for storing users' private keys, and a distributed ledger 208. The system 2000 also includes a plurality of distributed nodes 214, 216 each hosting the distributed ledger 208. It will be appreciated that, in some embodiments, numerous nodes 214, 216 may host the distributed ledger 208 and that the exchange system 202 may not host the distributed ledger 208. In the example shown in FIG. 2, the exchange system 202 and nodes 214, 216 are nodes of a blockchain network. In the example of the Bitcoin blockchain or other public blockchains, there may be a vast number of nodes. The secure data storage device 206 may utilize various forms of encryption and secure storage mechanisms to protect the sensitive private keys stored therein from being accessed or compromised.

With continued reference to FIG. 2, a user device 211 functions as a verifying system and accesses the exchange system 202 to check a user's balance, trade digital assets, deposit funds in fiat currency or cryptocurrency, withdraw digital assets, and/or the like. The user device 211 may access the exchange system 202 via a network 210, such as the Internet, and interacts with one or more digital assets through one or more graphical user interfaces (GUI) 212 displayed on the user device 211. Through the GUIs 212, the user may request that the exchange system 202 validate its own solvency and confirm that the exchange system 202 holds the private keys that correspond to its total digital assets. In the case of the Bitcoin blockchain network, which manages and regulates the Bitcoin cryptocurrency and other cryptocurrencies (e.g., Bitcoin Cash, through a fork in the Bitcoin blockchain network), the exchange system 202 holds a private key that corresponds to a public key uniquely corresponding to the user. The public key for a user may be kept secret by the user; however, because the distributed ledger 208 identifies the user's blockchain address with a hash of the user's public key rather than the public key itself.

The exchange system 202 demonstrates that it controls sufficient reserves to settle each customer's account such that, if the exchange loses a large amount of digital assets in an attack, the exchange would not be able to provide computational statements that prove its solvency. Thus, customers will find out about the attack quickly and take necessary actions. In the example of an exchange for Bitcoin, a Bitcoin address is a 160-bit hash of the public portion of a public/private ECDSA keypair, where the public portion is derived from the private key by doing an exponentiation operation on the secp256k1 curve. Because Bitcoin addresses do not reveal the public key of the public/private key pair, and instead only a hash, the Bitcoin address can remain anonymous. Thus, to prove its solvency, the exchange wants to establish that it knows the private keys corresponding to some hashed public keys are available on the blockchain and, do to so anonymously, must do so without revealing either the private or public keys of the customer's public/private key pair. By keeping the public keys secret, an adversary or potential cryptocurrency thief is unable to track the movement of the exchanges' funds.

To prove its solvency, the exchange system 202 needs to prove to its customers and/or regulators (e.g., verifying systems 211) that it knows a secret x such that $H(g^x)=y$, where H is a hash function such as SHA-256. The statement has both algebraic ($g^x$) and Boolean (hash function H) components, where the algebraic component relates the private key and public key, and the Boolean component relates the public key and hashed public key. The exchange system 202 is configured to perform three primary tasks to prove its solvency: (1) a proof of liabilities that allows customers (e.g., verifying systems 211) to verify that their accounts are included in the total; (2) a proof of assets which shows that the exchange has a certain amount of reserves; and (3) a proof that the reserves cover the liabilities to an acceptable degree.

An example will be shown of how each of these three primary tasks may be carried out by the exchange system 202 in a non-limiting example in which the exchange is proving solvency of Bitcoin reserves, although it will be appreciated that similar approaches may be utilized for other cryptocurrencies and digital assets. In the following example, let g, h be fixed public generators of a group G of order q. For a Bitcoin public key y, $x \in Z_q$ is the corresponding secret key such that $y=g^x$. In a first component of a zero-knowledge algorithm configured to provide a proof of assets, for a group element $k=(k_x; k_y)$, Com(k) refers to a generated commitment to the coordinates of k, e.g., Com $(k)=(Com(k_x), Com(k_y))$. The Bitcoin address corresponding to a key y is given by h=H(y), where H hashes y to a more compact representation. The balance associated with a Bitcoin address h is represented by: bal(h).

The exchange system 202 generates components of a zero-knowledge algorithm configured to prove that the exchange system 202 has sufficient assets by first generating a commitment to its total assets along with a zero-knowledge proof that the exchange knows the private keys for a set of Bitcoin addresses whose total value is equal to the committed value. To do this, the exchange creates a set of hashes PK to serve as an anonymity set: $PK=\{h_1, \ldots, h_n\}$ from the public data available on the blockchain. In this example, $x_1, \ldots, x_n$ refer to the corresponding secret keys, such that $h_i=H(g^{x_i})$, $s_i$ indicates whether the exchange knows the ith secret key. The total assets can be expressed as Assets=$\Sigma^n_{i=1} s_i \cdot bal(h_i)$. The public data available on the blockchain is $h_i=H(y_i)$, $p_i=g^{bal(h_i)}$ for all $i \in [1,n]$.

The following computational statements, generated by one or more processors and used as components of a zero-knowledge algorithm, prove that the exchange system 202 controls sufficient assets:

(1) The exchange system 202 generates the commitments. For $i \in [1,n]$, the exchange system commits to $x_i$ by publishing $\alpha_i=Com_q(x_i)=g^{x_i}h^{r_i}$, and commits to $y_i$ by publishing $\beta_i=Com_q(y_i)$.

(2) The exchange system 202 commits to the balance in each address for the public keys it controls and to 0 otherwise, by publishing $u_i=Com_q(s_i \cdot bal(h_i))=g^{s_i \cdot bal(h_i)}h^{r_i}$, $s_i \in \{0, 1\}$, where $s_i=1$ if the exchange system knows $x_i$ such that $y_i=g^{x_i}$.

(3) The exchange system 202 uses protocols ddlog, comIOSnark and the constructions for function composition and OR composition, composition and compoundOR respectively, to prove the following for each is $\pi_i$: $\Big\{(x_i, y_i, s_i, r_i, a_i, b_i, t_i):$ $\begin{pmatrix} \alpha_i = Com_q(x_i) \wedge \beta_i = Com_q(y_i) \wedge \\ u_i = Com_q(s_i \cdot bal(h_i)) \wedge f_1(f_2(x_i), h_i) = s_i \wedge s_i = 1 \end{pmatrix} \vee (s_i = 0)\Big\}$ where $f_2(x) = g^x$ and $f_1(y, h) = \begin{cases} 1 & \text{if } H(y) = h \\ 0 & \text{otherwise} \end{cases}$.

(4) The exchange system 202 generates and publishes $Z_{Assets}=\Pi_{i=1}^n u_i$.

The exchange system 202 also generates a component of a zero-knowledge algorithm configured to prove that the exchange system has committed to its total liability and that each customer's respective balances are included in that total commitment. The exchange may map each customer to an entry, such as an identifier, in a data structure representing the exchange system's liabilities, such as a liability list. For example, each customer may be provided with an identifier, such as an account number, user name, email address, and/or the like, and the exchange system utilizes a hash-based commitment scheme to commit to those customer identifiers.

To ensure that any included users can only add to the exchange system's total liabilities, the exchange system 202 generates a zero-knowledge algorithm to prove that each committed balance falls within an interval between 0 and Max=$2^{51}$. The protocol provided by non-limiting embodiments for zk-SNARK on committed input allows for the use of a circuit to check the range without using bitwise commitments (which contributes to the bulk of the proof size). The following components of a zero-knowledge algorithm, which include computational statements generated by the exchange system 202, allows the exchange system 202 to verifiably commit to its total liabilities $Z_{Liab}$, and convince customers of inclusion of their balances in $Z_{Liab}$. For this example, let C be a circuit that takes as input m bit integers $x_1, \ldots, x_n$ and outputs 1 if $x_i$<Max for all i and 0 otherwise:

(1) The exchange system 202 commits to each customer $C_i$'s balance $x_i$ by publishing $c_i=Com_q(x_i)=g^{x_i}h^{r_i}$.

(2) The exchange system 202 uses the protocol comInSnark to prove that $x_i$<Max for all customers. $\pi$: PK$\{(x_i, r_i):C(x_i, \ldots, x_n)=1 \wedge c_i=Com_q(x_i)\}$.

(3) The exchange system 202 computes a customer identifier for each customer by choosing a random nonce and computing $CID_i=H(user_i \| n_i)$, where $n_i \in \{0, 1\}^{512}$, $user_i$ is the ith customer's username, and H is a collision resistant hash function.

(4) The exchange system 202 publishes the liabilities list of all customers' tuples: ListLiab=$(CID_1, \ldots, CID_n, \ldots, c_n, \pi)$.

Each verifying system 211 is privately given $(r_i, n_i)$ and the verifying system computes CID and verifies inclusion in the liabilities list; the client checks its own balance and is included by computing $c_i=g^{bal_i}h^{r_i}$; the verifying system verifies the proof n; and each verifying system computes $Z_{Liab}=\Pi_{i=1}^n c_i$.

Once the exchange system 202 generates components of a zero-knowledge algorithm configured to prove the exchange system's total assets and total liabilities, the exchange system 202 generates a zero-knowledge algorithm configured to prove that the exchange system is solvent by proving that $Z_{Assets}/Z_{Liab}$ is a commitment to 0. As an example, the computational statement may be: $\pi$: PK$\{(R): Z=h^R\}$, where $Z=Z_{Assets} \cdot Z_{Liab}^{-1}$.

Figure 3:
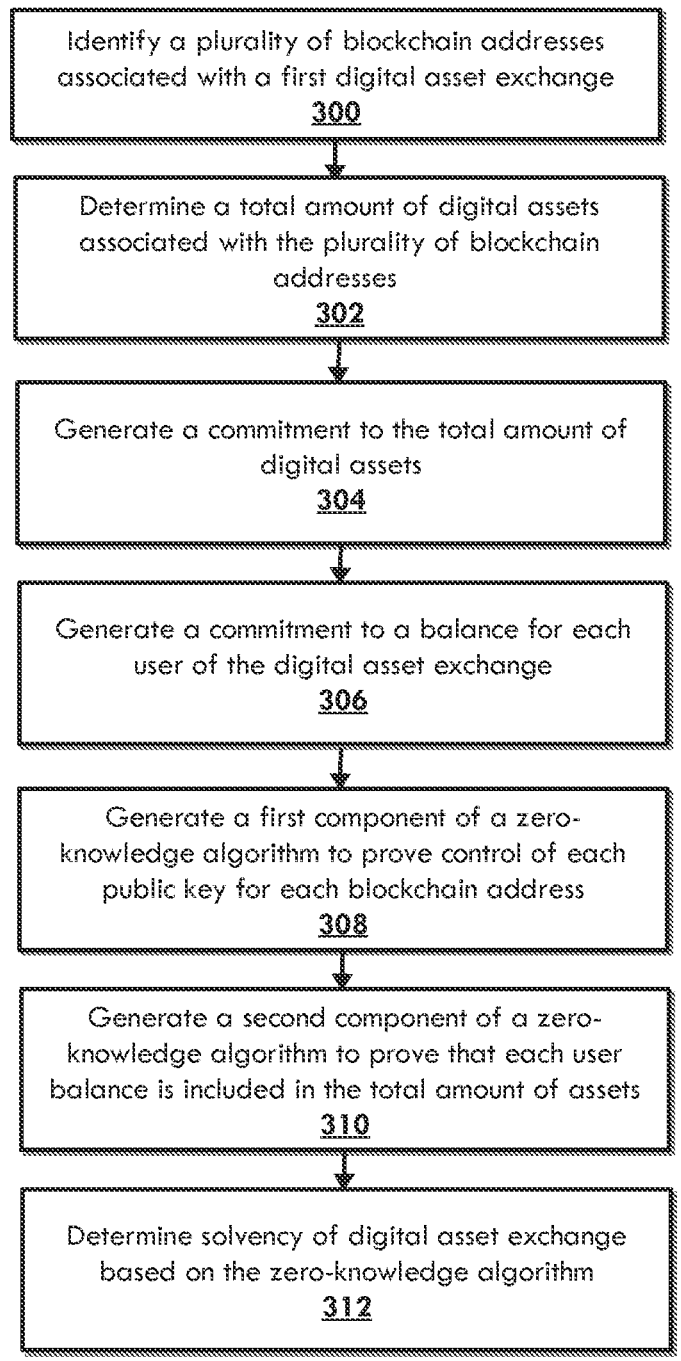
FIG. 3 is a flow diagram of a method for determining solvency of a digital asset exchange according to some non-limiting embodiments or aspects.

Referring now to FIG. 3, a method for determining solvency of a digital asset exchange is shown according to some non-limiting embodiments or aspects. As a first step 300, the exchange system identifies a plurality of blockchain addresses that it controls. As an example, the exchange system may identify a plurality of public blockchain addresses that correspond to each of a plurality of public/private key pairs that are maintained by the exchange system 202. The blockchain address may include a hashed public key, as an example, to maintain the secrecy of both the public and private key. Moreover, in step 300, the exchange system may generate a set of hashes for each public blockchain address it controls a corresponding key for. The set of hashes serves as an anonymity set (PK={$h_1, \ldots, h_n$}) from the public data available on the blockchain network (e.g., $h_i=H(y_i)$, $p_i=g^{bal(h_i)}$ for all $i \in [1, n]$).

With continued reference to FIG. 3, at a next step 302, the exchange system determines a total amount of digital assets associated with the plurality of blockchain addresses. The total amount of digital assets may be determined from the public distributed ledger in the blockchain network. At step 304, the exchange system generates a commitment to the total amount of digital assets. At step 306, the exchange system generates a commitment to each individual user balance for each user of the exchange system. As explained herein, the exchange system may generate commitments as a point along an elliptic curve or through a hash commitment protocol. At step 308, the exchange system generates a first component of a zero-knowledge algorithm configured to prove that the exchange system has control of each public key corresponding to each blockchain address. Because the blockchain addresses may be hashes of public keys, such a programmatic function involves a Boolean function. In some non-limiting embodiments or aspects, the first component of the zero-knowledge algorithm includes a zkSNARK statement that receives, as input, a commitment of total assets.

At step 310, the exchange system generates a second component of a zero-knowledge algorithm configured to prove that each user balance is included in the total amount of assets corresponding to the plurality of blockchain addresses which the exchange system controls. Because the balances are attributable to individual users that are rendered anonymous through elliptic curve cryptography, such a programmatic function involves an algebraic function. In some non-limiting embodiments or aspects, the second component of the zero-knowledge algorithm is a Sigma protocol statement that receives, as input, at least a commitment to user balances.

Still referring to FIG. 3, at step 312, the exchange system determines its solvency based on the zero-knowledge algorithm. The exchange system may also provide the zero-knowledge algorithm to a verifying system such that the verifying system is able to determine that the exchange system is solvent. Such determination may involve a determination that the total assets and total liabilities even out to a commitment of zero (0). The zero-knowledge algorithm is configured to prove solvency of the exchange system by proving $\pi$: PK{(R):Z=$h^R$}, where Z=$Z_{Assets}/Z_{Liab}$. In this example proof, $Z_{Assets}$ is a commitment to the total assets of the digital asset exchange and $Z_{Liab}$ is a commitment to the total liabilities (e.g., user balances) of the digital asset exchange.

In some non-limiting embodiments or aspects, digital certificates may be generated and used anonymously such that a zero-knowledge algorithm can be used to verify an anonymous certificate. For example, a user may obtain credentials from an organization or a Certificate Authority and later prove to a verifying system that she has been given appropriate credentials. The user's credentials may contain a set of attributes, and the verifying system may require that the user prove that the attributes in her credential satisfy a certain policy. In particular, digital certificates, such as but not limited to X.509 certificates, may include a message m that may contain various identifying information about a user or a machine, and a digital signature (by a Certificate Authority) on the message attesting to its authenticity. The digital signature can then be verified by anyone who holds the public verification key corresponding to the private key used to generate the digital signature. In existing systems and methodologies, digital certificates reveal the message m and, as a result, reveal the identity of the owner.

In order to provide anonymous credentials, the message cannot be revealed. Using anonymous credentials relies on a ZKP of knowledge of the message m and a signature $\sigma$, where $\sigma$ is a valid signature on the message m with respect to the verification key vk. In such embodiments, the message m is hashed before being algebraically signed (e.g., RSA or elliptic-curve operations). In order to avoid a proof for this hybrid statement that uses only zkSNARKs, and is therefore inefficient for the algebraic component, or is interactive (e.g., requiring the proving system and verifying system to exchange multiple messages), the use of both zkSNARKs and Sigma protocols yields efficiencies of computational resources. Non-limiting embodiments provide eight (8) times fewer group exponentiations compared to existing techniques by avoiding resource-intensive circuit representation of algebraic statements.

In some non-limiting embodiments or aspects, an anonymous digital certificate system includes one or more processors configured to generate a zero-knowledge algorithm involving an algebraic relation (for the exponentiation) and a circuit-based statement (for the hash function). In this way, no circuit-based statement is needed for the exponentiation which, in this example, is a digital signature encrypted using the RSA algorithm. Thus, given a hash digest of a message m (such as a SHA hash digest), a candidate RSA signature $\sigma$, and an RSA modulus N, verification involves checking whether $\sigma^e$ mod n=h, where h=padding(SHA(m)). The following computational statements, generated by one or more processors, achieves privacy-preserving verification for credentials based on RSA signatures:

(1) The proving system commits to the message m, the digest h, and the signature $\sigma$ by computing $c_1$=Com$_p$(m), $c_2$=Com$_p$(h), $c_3$=Com$_n$($\sigma$), $c_4$=Com$_n$(h) for p<n.

(2) The proving system uses zk-comIOSnark to give a proof that the hash digest is correct, given $c_1$ and $c_2$: PK{(m, h, $r_1$, $r_2$): padding(SHA(m))=h^$c_i$=Com$_p$(m) ^$c_2$=Com$_p$(h)}.

(3) The proving system uses a sigma protocol to prove knowledge of e-th root of a committed value: PK{(h, $\sigma$, $r_2$, $r_3$): $\sigma^e$ mod n=h^$c_2$=Com$_n$(h)^$c_3$=Com$_n$($\sigma$)}.

(4) The proving system uses the protocol Eq to prove that the commitments $c_2$ and $c_4$ are to the same value: PK{(h, h', $r_2$, $r_4$): $c_2$=Com$_p$(h)^$c_4$=Com$_n$(h')^h=h' mod p}.

A verification process utilizing the above processing techniques provide for efficiency privacy-preserving verification based on existing infrastructure, like standard RDA-PSS, RSA-PKCS, and/or the like. It will be appreciated by those skilled in the art that other digital signature algorithms and schemas may also be used.

Figure 5:
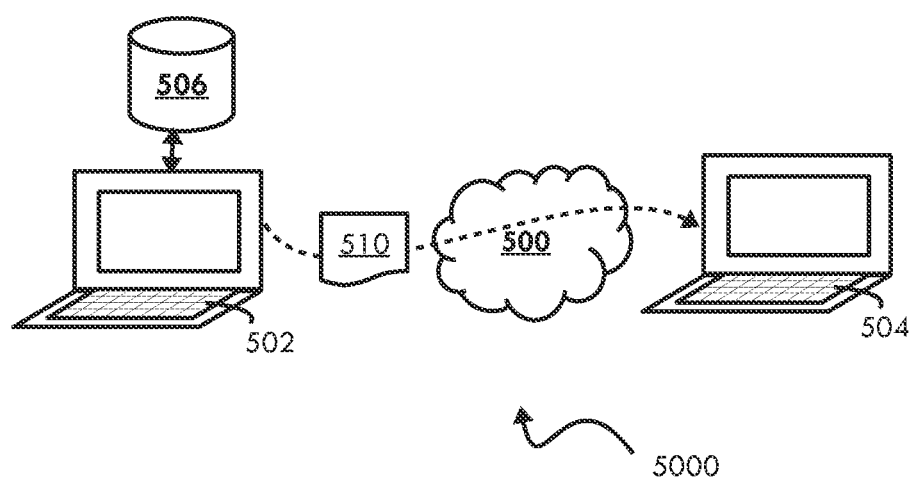
FIG. 5 is a schematic diagram of a system for generating and verifying an anonymous digital signature according to some non-limiting embodiments or aspects.

Referring now to FIG. 5, an anonymous digital certificate system 5000 is shown according to some non-limiting embodiments or aspects. A proving system 502 is in communication with a verifying system 504. It will be appreciated that the proving system 502 and verifying system 504 may be one or more of any type of computing device, such as a server computer, mobile device, and/or the like. The proving system 502 has access to a secret private key and message stored in a secure data storage device 506. The proving system generates an anonymous digital signature 510 by hashing the message according to a hash function and signing the hashed message with the private key by applying one or more cryptographic operations such as an RSA or elliptic curve algorithm. The proving system 502 communicates the anonymous digital signature 510 to the verifying system 504. The verifying system may have access to the hashed message or, in some examples, the proving system 502 may communicate the hashed message to the verifying system.

With continued reference to FIG. 5, the proving system 502 communicates with the verifying system through at least one network environment 500. It will be appreciated that the proving system 502 may communicate in a secure manner as to stay anonymous. In some examples, the proving system 502 may only indirectly communicate with the verifying system 504 through an intermediary system (not shown in FIG. 5) to preserve anonymity. The proving system 502 generates a commitment to the message and private key, communicates the commitment to the verifying system 504, and generates a zero-knowledge algorithm configured to facilitate the verifying system 504 to verify the anonymous digital signature 510 without having access to the message or the private key. The verifying system 504 receives this data and executes the zero-knowledge algorithm to verify the anonymous digital signature 510 given the commitment and the public key.

Figure 4:
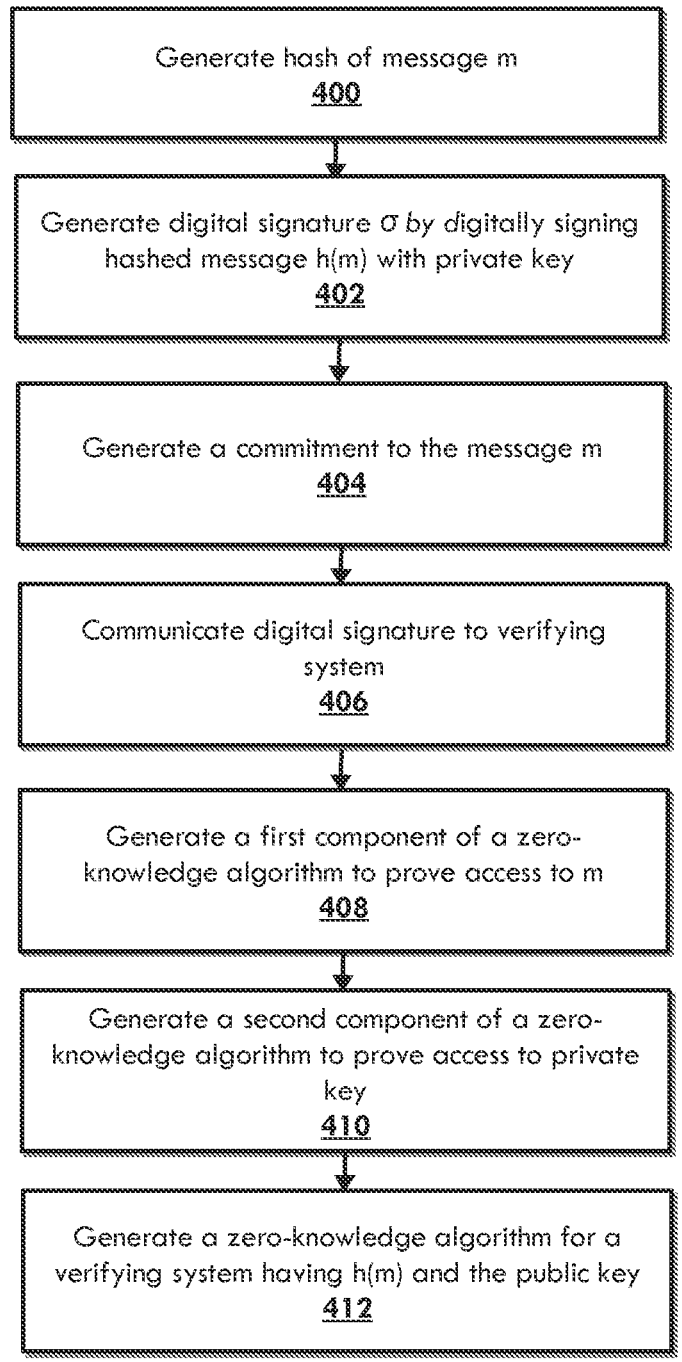
FIG. 4 is a flow diagram of a method for generating and verifying an anonymous digital signature according to some non-limiting embodiments or aspects.

Referring now to FIG. 4, a method for generating and verifying anonymous digital signatures is shown according to some non-limiting embodiments or aspects. At a first step 400, a proving system generates a hash of a message m. The message m may identify a user or other identifiable information that the user may want to keep secret while still being able to verify that the user is in possession of a secret key corresponding to a public key. At a next step 402, the proving system generates an anonymous digital signature by digitally signing the hashed message with the private key using an asymmetrical encryption algorithm. At step 404, the proving system generates a commitment to the message m. As explained herein, the exchange system may generate commitments as points along an elliptic curve or through a hash commitment protocol. At step 406, the proving system communicates the anonymous digital signature to the verifying system, although it will be appreciated that the digital signature may be communicated at any time subsequent to its generation.

At step 408, the proving system generates a first component of a zero-knowledge algorithm configured to prove that the proving system has knowledge of the message. Because the known variable is the hashed message, such a programmatic function involves a Boolean function. In some non-limiting embodiments or aspects, the first component of the zero-knowledge algorithm includes a zkSNARK statement that receives, as input, a commitment of the message. At step 410, the proving system generates a second component of a zero-knowledge algorithm configured to prove that the proving system has knowledge of and access to the private key. Because the hashed message was digitally signed using elliptic curve cryptography techniques, such a programmatic function involves an algebraic function. In some non-limiting embodiments or aspects, the second component of the zero-knowledge algorithm is a Sigma protocol statement that receives, as input, at least a commitment to the private key.

Still referring to FIG. 4, at step 412, the proving system generates a zero-knowledge algorithm to be communicated to a verifying system such that the verifying system can verify that the proving system has access to the private key and message. The combination of zkSNARK and Sigma protocol statements allows for a compound computational statement to be generated as part of the zero-knowledge algorithm that is efficient with resources and uses the commitments as input.

Figure 6:
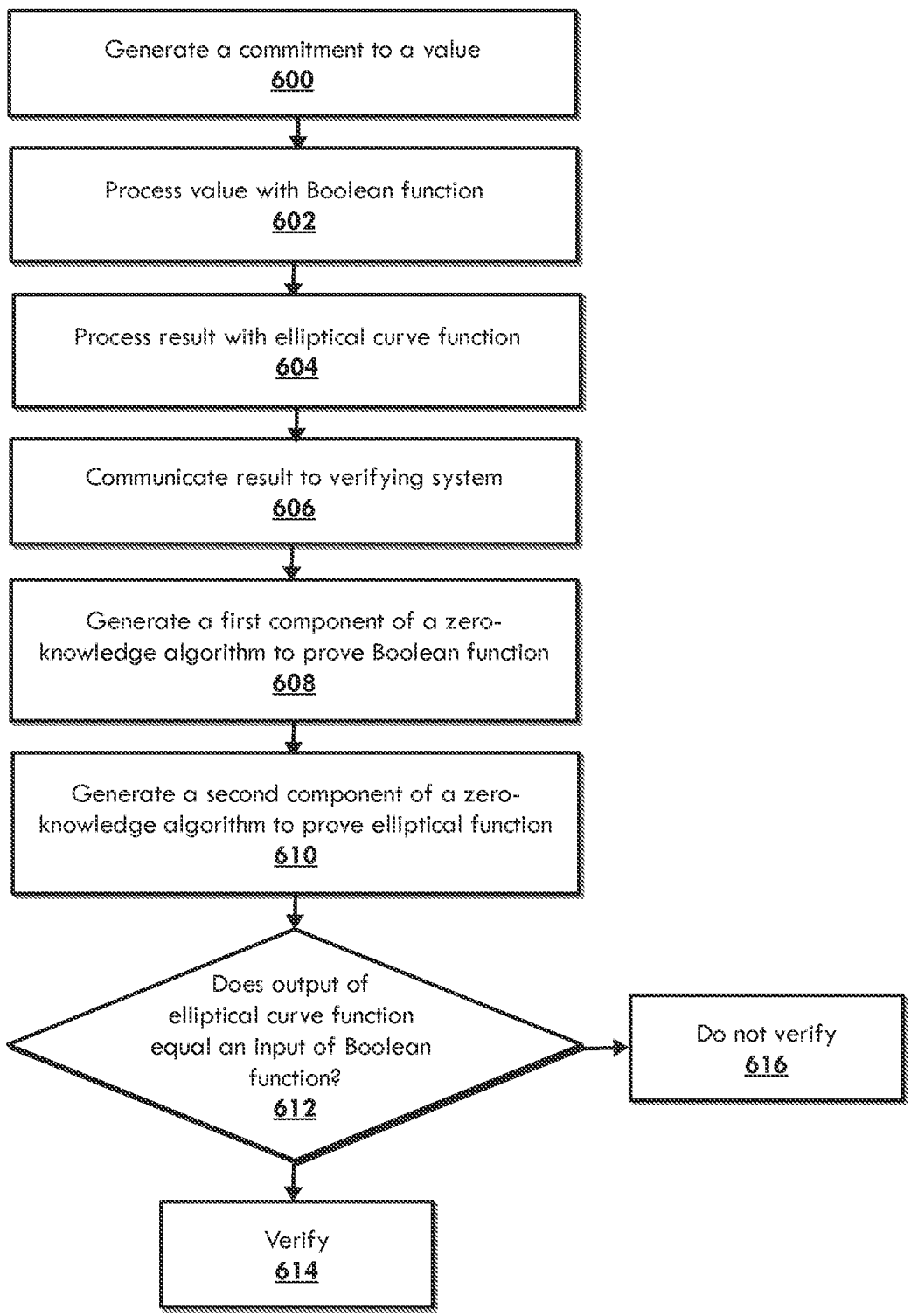
FIG. 6 is a flow diagram of a method for generating a zero-knowledge algorithm for proving knowledge of or access to a value according to some non-limiting embodiments or aspects.

Referring now to FIG. 6, a method for verifying access to or knowledge of a secret value is shown according to some non-limiting embodiments or aspects. The method shown in FIG. 6 may be used in any number of use cases and scenarios in which a proving system seeks to prove access to or knowledge of a value while keeping the value and any identifying information secret. At a first step 600, the proving system generates a commitment to the secret value. At a second step 602, the value is processed with a Boolean function. For example, the value may be processed with a hash function. At step 604, the hashed value is processed by an algebraic function, such as an elliptic curve function. The final result, which is the product of performing the algebraic function on the hashed value, is communicated to a verifying system along with the commitment at step 606.

With continued reference to FIG. 6, at step 608, the proving system generates a first component of a zero-knowledge algorithm that corresponds to the Boolean function applied at step 602. As an example, the first component may include a zkSNARK statement. At step 610, the proving system generates a second component of a zero-knowledge algorithm that corresponds to the algebraic function applied in step 604. As an example, the second component may include a Sigma protocol statement. The first and second components of the zero-knowledge algorithm are used to construct the zero-knowledge algorithm given the commitments generated at step 600. At step 612, the zero-knowledge algorithm is executed by a verifying system to determine if an output of the elliptic curve function used at step 604 is equal to the input of the Boolean function used at step 602. The zero-knowledge algorithm allows this to be performed by the verifying system having the generated commitment. If the verifying system executes the zero-knowledge algorithm at step 612 and determines that the proof completes, the method proceed to step 614 in which the verifying system verifies the result. If the verifying system executes the zero-knowledge algorithm at step 612 and determines that the proof does not complete, the method proceeds to step 616 in which the verifying system rejects the verification.

Although the disclosure has been described in detail for the purpose of illustration based on what is currently considered to be the most practical and preferred and non-limiting embodiments or aspects, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method comprising:
identifying, with at least one processor, a plurality of blockchain addresses corresponding to a plurality of users of a digital asset exchange system;
generating, with at least one processor, a first commitment to an amount of digital assets corresponding to the plurality of blockchain addresses;
generating, with at least one processor, a second commitment to a balance of each user of the plurality of users;
generating, with at least one processor, a first component of a zero-knowledge algorithm that is configured to receive, as input, the first commitment, wherein the first component of the zero-knowledge algorithm proves to a verifying system that the digital asset exchange system knows all private keys used to generate the plurality of blockchain addresses;
generating, with at least one processor, a second component of the zero-knowledge algorithm that is configured to receive, as input, the second commitment, wherein the second component of the zero-knowledge algorithm proves to a verifying system that each user balance of the second commitment is included in the amount of digital assets, wherein the second component of the zero-knowledge algorithm further comprises a circuit configured to verify that each user balance has a value in an interval between zero and a maximum; and
determining, with at least one processor, that the digital asset exchange system is solvent based on the zero-knowledge algorithm.

2. The computer-implemented method of claim 1, wherein the first component of the zero-knowledge algorithm comprises a zkSNARK protocol.

3. The computer-implemented method of claim 2, wherein the second component of the zero-knowledge algorithm comprises a Sigma protocol.

4. The computer-implemented method of claim 1, further comprising hosting, with at least one processor, a public copy of a distributed ledger of a public blockchain network, wherein the plurality of blockchain addresses are encrypted and published on the distributed ledger.

5. The computer-implemented method of claim 4, further comprising storing, with at least one processor, the private keys used to generate the plurality of blockchain addresses in a non-public secure data storage device, wherein each blockchain address of the plurality of blockchain addresses comprises a hash of a public key associated with a private key of the private keys.

6. The computer-implemented method of claim 1, wherein the first commitment comprises a first point along an elliptic curve, and wherein the second commitment comprises a second point along an elliptic curve.

7. The computer-implemented method of claim 1, further comprising:
receiving, with at least one processor, a request for a proof of solvency from a user device of a user of the plurality of users; and
in response to receiving the request, generating the zero-knowledge algorithm.

8. A system comprising:
at least one processor in communication with a public blockchain network, the at least one processor programmed or configured to:
identify a plurality of blockchain addresses corresponding to the plurality of users of a digital asset exchange system;
generate a first commitment to an amount of digital assets corresponding to the plurality of blockchain addresses;
generate a second commitment to a balance of each user of the plurality of users;
generate a first component of a zero-knowledge algorithm that is configured to receive, as input, the first commitment, wherein the first component of the zero-knowledge algorithm proves to a verifying system that the digital asset exchange system knows all private keys used to generate the plurality of blockchain addresses;
generate a second component of the zero-knowledge algorithm that is configured to receive, as input, the second commitment, wherein the second component of the zero-knowledge algorithm proves to a verifying system that each user balance of the second commitment is included in the amount of digital assets, wherein the second component of the zero-knowledge algorithm further comprises a circuit configured to verify that each user balance has a value in an interval between zero and a maximum; and
determine that the digital asset exchange system is solvent based on the zero-knowledge algorithm.

9. The system of claim 8, wherein the first component of the zero-knowledge algorithm comprises a zkSNARK protocol.

10. The system of claim 8, wherein the second component of the zero-knowledge algorithm comprises a Sigma protocol.

11. The system of claim 8, wherein the at least one processor is further programmed or configured to host a public copy of a distributed ledger of the public blockchain network, wherein the plurality of blockchain addresses are encrypted and published on the distributed ledger.

12. The system of claim 11, further comprising a non-public secure data storage device, wherein the at least one processor is further programmed or configured to store the private keys used to generate the plurality of blockchain addresses in the secure data storage device, wherein each blockchain address of the plurality of blockchain addresses comprises a hash of a public key associated with a private key of the private keys.

13. The system of claim 8, wherein the first commitment comprises a first point along an elliptic curve, and wherein the second commitment comprises a second point along an elliptic curve.

14. The system of claim 8, wherein the at least one processor is further programmed or configured to:
receive a request for a proof of solvency from a user device of a user of the plurality of users; and
in response to receiving the request, generate the zero-knowledge algorithm.

15. A computer program product comprising at least one non-transitory computer-readable medium storing one or more instructions that, when executed by at least one processor, cause the at least one processor to:
identify a plurality of blockchain addresses corresponding to a plurality of users of a digital asset exchange system;
generate a first commitment to an amount of digital assets corresponding to the plurality of blockchain addresses;
generate a second commitment to a balance of each user of the plurality of users;
generate a first component of a zero-knowledge algorithm that is configured to receive, as input, the first commitment, wherein the first component of the zero-knowledge algorithm proves to a verifying system that the digital asset exchange system knows all private keys used to generate the plurality of blockchain addresses;
generate a second component of the zero-knowledge algorithm that is configured to receive, as input, the second commitment, wherein the second component of the zero-knowledge algorithm proves to a verifying system that each user balance of the second commitment is included in the amount of digital assets, wherein the second component of the zero-knowledge algorithm further comprises a circuit configured to verify that each user balance has a value in an interval between zero and a maximum; and
determine that the digital asset exchange system is solvent based on the zero-knowledge algorithm.

16. The computer program product of claim 15, wherein the first component of the zero-knowledge algorithm comprises a zkSNARK protocol.

17. The computer program product of claim 15, wherein the second component of the zero-knowledge algorithm comprises a Sigma protocol.

18. The computer program product of claim 15, wherein the one or more instructions further cause the at least one processor to host a public copy of a distributed ledger of a public blockchain network, wherein the plurality of blockchain addresses are encrypted and published on the distributed ledger.

19. The computer program product of claim 18, wherein the one or more instructions further cause the at least one processor to store the private keys used to generate the plurality of blockchain addresses in a non-public secure data storage device, wherein each blockchain address of the plurality of blockchain addresses comprises a hash of a public key associated with a private key of the private keys.

20. The computer program product of claim 15, wherein the one or more instructions further cause the at least one processor to:
receive a request for a proof of solvency from a user device of a user of the plurality of users; and
in response to receiving the request, generate the zero-knowledge algorithm.

\* \* \* \* \*

UNITED STATES PATENT AND TRADEMARK OFFICE
CERTIFICATE OF CORRECTION

| | |
|---|---|
| PATENT NO. | : 12,067,575 B2 |
| APPLICATION NO. | : 18/125864 |
| DATED | : August 20, 2024 |
| INVENTOR(S) | : Payman Mohassel et al. |

It is certified that error appears in the above-identified patent and that said Letters Patent is hereby corrected as shown below:

On the Title Page

Column 1, Item (71) Applicant, Line 1, delete "Assocation," and insert -- Association, --

Signed and Sealed this
Twenty-second Day of October, 2024

Katherine Kelly Vidal
*Director of the United States Patent and Trademark Office*